United States Patent
Huang et al.

(10) Patent No.: US 7,965,932 B2
(45) Date of Patent: Jun. 21, 2011

(54) ACTUATOR AND ANTI-VIBRATION CAMERA MODULE USING SAME

(75) Inventors: Yu-Chien Huang, Taipei Hsien (TW); Tai-Hsu Chou, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/574,794

(22) Filed: Oct. 7, 2009

(65) Prior Publication Data
US 2010/0259822 A1  Oct. 14, 2010

(30) Foreign Application Priority Data
Apr. 8, 2009  (CN) .......................... 2009 1 0301399

(51) Int. Cl.
G03B 17/00  (2006.01)
H04N 5/228  (2006.01)

(52) U.S. Cl. ..................................... 396/55; 348/208.11

(58) Field of Classification Search .................... 396/55; 348/208.11
See application file for complete search history.

(56) References Cited

U.S. PATENT DOCUMENTS

| | | | | |
|---|---|---|---|---|
| 4,643,522 A | * | 2/1987 | Takashima | 359/824 |
| 6,052,240 A | * | 4/2000 | Ikari | 359/819 |
| 6,154,611 A | * | 11/2000 | Washisu | 396/55 |
| 6,397,008 B2 | * | 5/2002 | Kuwana et al. | 396/55 |
| 7,440,688 B2 | * | 10/2008 | Uehara et al. | 396/55 |
| 7,463,436 B2 | * | 12/2008 | Takahashi et al. | 359/824 |
| 7,466,910 B2 | * | 12/2008 | Akada et al. | 396/55 |
| 7,675,566 B2 | * | 3/2010 | Tagome et al. | 348/357 |
| 2006/0165397 A1 | * | 7/2006 | Uehara et al. | 396/55 |
| 2009/0263116 A1 | * | 10/2009 | Saito | 396/55 |

* cited by examiner

*Primary Examiner* — Rodney E Fuller
(74) *Attorney, Agent, or Firm* — Raymond J. Chew

(57) ABSTRACT

An actuator includes a first barrel, a second barrel, a first magnetic portion, a second magnetic portion and a plurality of springs. The second barrel is received in the first barrel. The first magnetic portion and the second magnetic portion are arranged between the first barrel and the second barrel. The first magnetic portion is fixed to the first barrel. The second magnetic portion is fixed to the second barrel. The first magnetic portion is opposite to the second magnetic portion. The first and second magnetic portions cooperatively drive the second barrel to move in the first barrel on the plane perpendicular to a central axis of the first barrel. The springs are elastically connected to the first barrel and to the second barrel, to provide a restoring force between the first barrel and the second barrel when the first barrel is not coaxial with the second barrel.

20 Claims, 4 Drawing Sheets

ACTUATOR AND ANTI-VIBRATION CAMERA MODULE USING SAME

BACKGROUND

1. Technical Field

The present disclosure relates to image capture, and particularly, to an actuator and an anti-vibration camera module having such actuator.

2. Description of Related Art

Portable image capture devices such as digital cameras and digital video cameras are widely used. Generally, these devices include a lens group and an image sensor such as a charge-coupled device (CCD) or complementary metal oxide semiconductor (CMOS). The lens group projects an image of a subject onto the image sensor and the image is converted into data and stored in a storage device such as a flash memory card.

However, image quality of these devices is negatively affected when subjected to vibration from external forces. Such vibration causes deflection of the optical axes in the devices, such that multiple images are formed on the image sensor and a blurred image is the result.

Therefore, an actuator and an anti-vibration camera module utilizing the actuator are desirable to overcome the limitations described.

DETAILED DESCRIPTION

Figure 1:
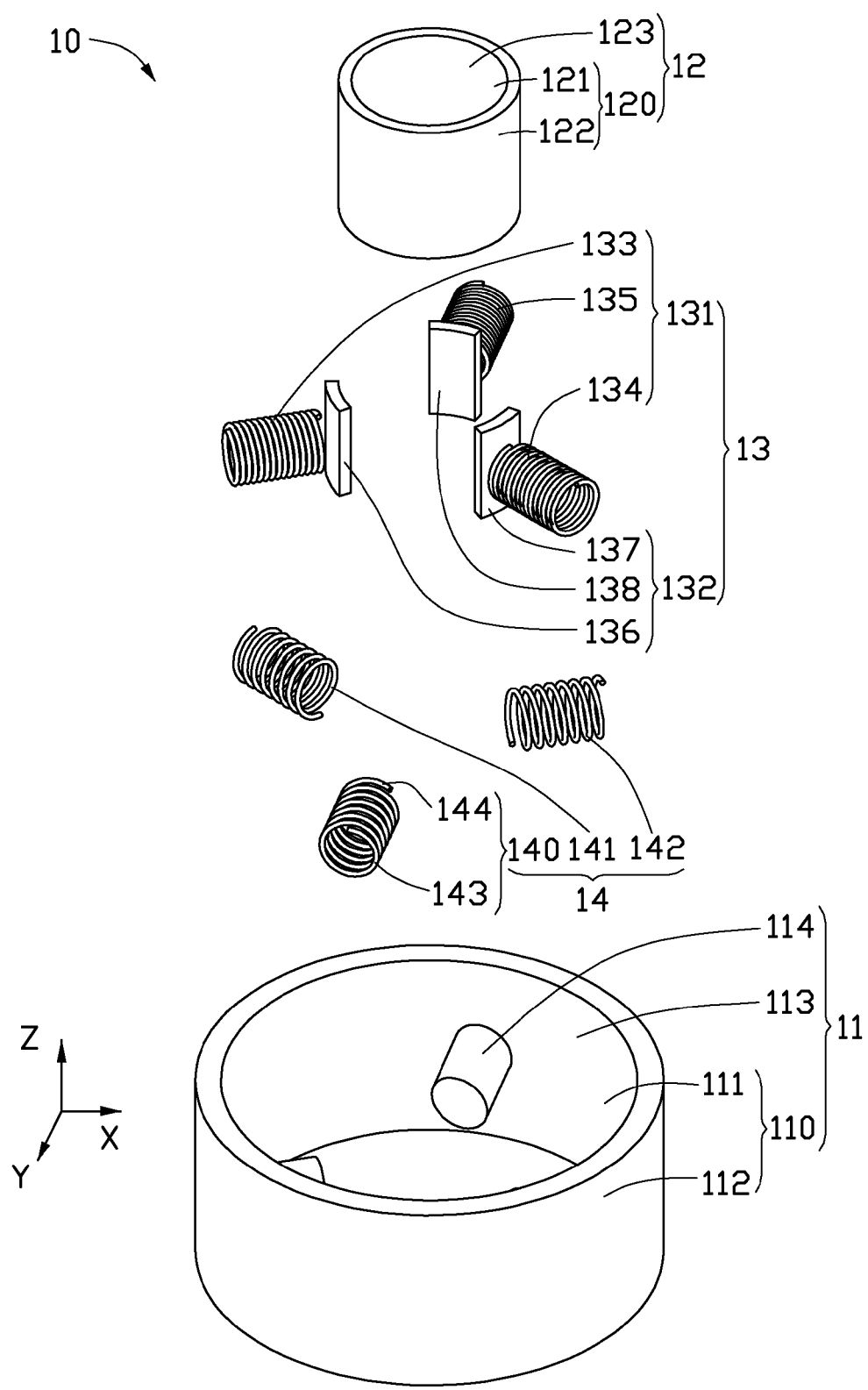
FIG. 1 is a schematic, exploded view of an actuator, according to an exemplary embodiment.

Referring to FIG. 1, an actuator 10, according to an exemplary embodiment, includes a first barrel 11, a second barrel 12 received in the first barrel 11, a driving unit 13 and a plurality of springs 14. The driving unit 13 and the springs 14 are arranged between the first barrel 11 and the second barrel 12.

Figure 2:
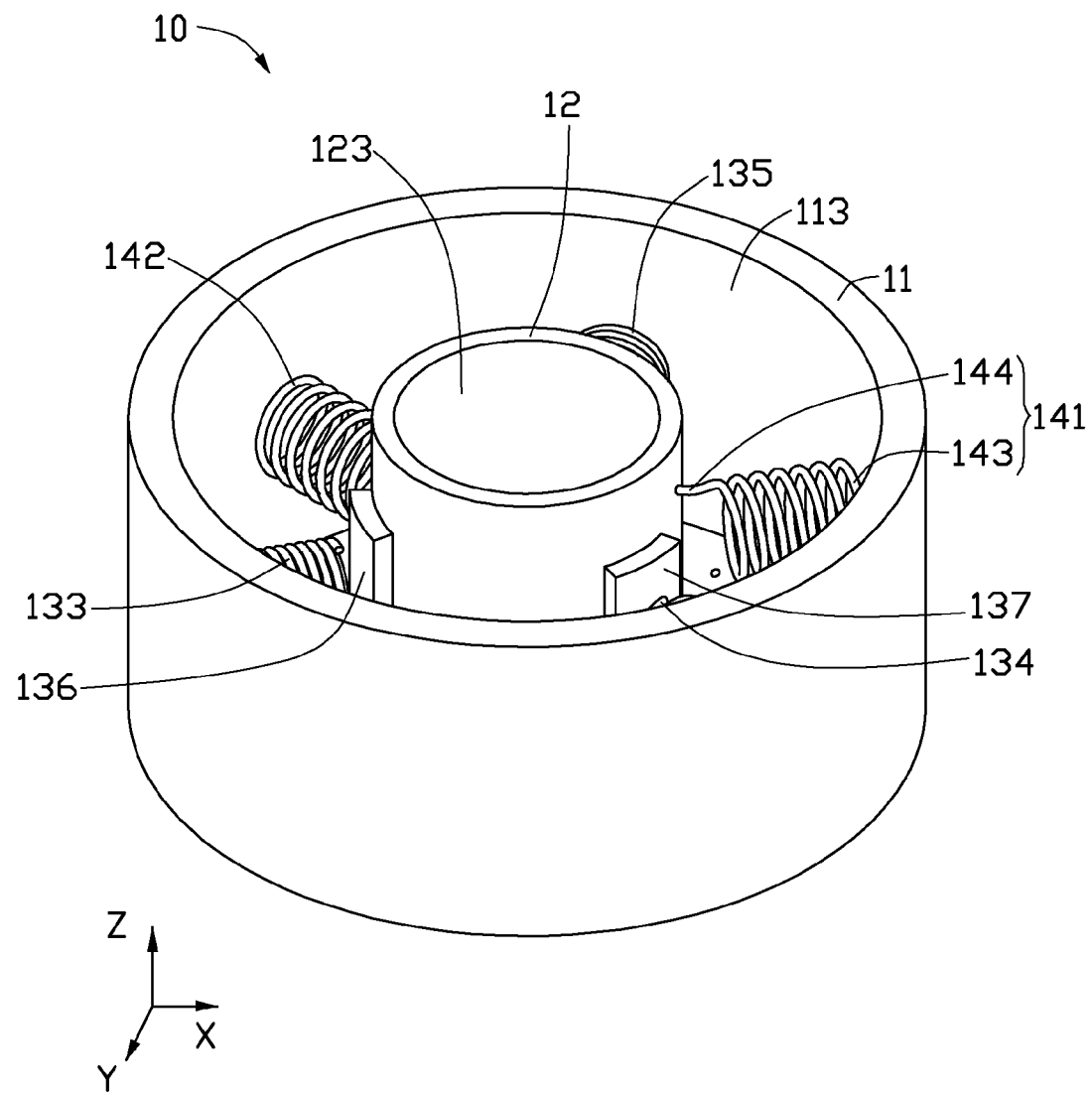
FIG. 2 is a schematic, isometric view of the actuator of FIG. 1.
Figure 3:
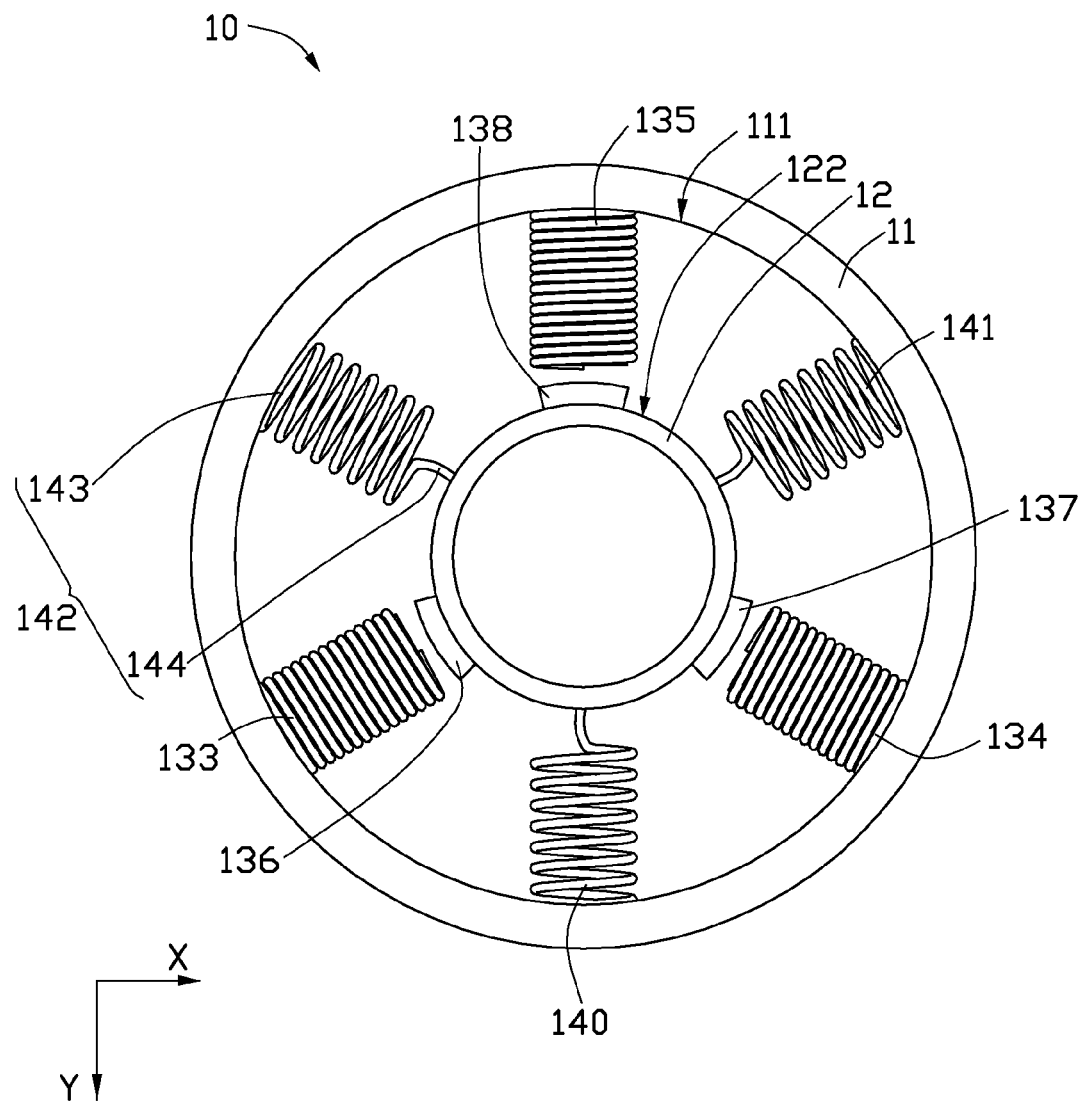
FIG. 3 is a schematic top view of the actuator of FIG. 1.

Also referring to FIGS. 2 and 3, the first barrel 11 is hollow and cylindrical. The first barrel 11 defines a first receiving cavity 113 surrounded by a first sidewall 110. The first sidewall 110 includes a first inner wall 111 and a first outer wall 112. A central axis of the first barrel 11 is parallel to the Z axis shown in both FIGS. 1 and 2. The first sidewall 110 defines a plurality of protrusions 114 protruding from the first inner wall 111 toward the central axis of the first barrel 11. In this embodiment, three protrusions 114 are disposed at an equal circumference, equidistantly spaced. Each protrusion 114 is columnar. It is understood that the protrusions 114 can alternatively be triangular prismical, quadrangular prismical, or other shape. The protrusions 114 are ferromagnetic material, such as soft iron.

The second barrel 12 is movably received in the first receiving cavity 113. A central axis of the second barrel 12 is parallel to the Z axis. When the driving unit 13 is idle and the springs 14 are in a relaxed state, the second barrel 12 is coaxial with the first barrel 11. The second barrel 12 defines a second receiving cavity 123 surrounded by a second sidewall 120 including a second inner wall 121 and an opposite second outer wall 122. The second receiving cavity 123 is configured for receiving lenses (see FIG. 4) or an image sensor.

The driving unit 13 includes a first magnetic portion 131 fixed to the first inner wall 111 and a second magnetic portion 132 fixed to the second outer wall 122. The second magnetic portion 132 and the first magnetic portion 131 cooperatively drive the second barrel 12 to move long the X/Y plane perpendicular to the central axis of the first barrel 11. At least one of the first magnetic portion 131 and the second magnetic portion 132 is an electromagnet, with interactive force therebetween controlled by an external voltage. Alternatively, the first magnetic portion 131 and the second magnetic portion 132 can both be electromagnets.

In this embodiment, the first magnetic portion 131 includes a first coil 133, a second coil 134 and a third coil 135, each surrounding one of the three protrusions 114 of the first barrel 11. The first magnetic portion 131 is configured as the electromagnet.

The second magnetic portion 132 includes a first magnet 136, a second magnet 137 and a third magnet 138. The three magnets 136, 137, 138 are fixed to the second outer wall 122 by adhesive and face the three coils 133, 134, 135, respectively. In detail, the first magnet 136 faces the first coil 133, the second magnet 137 faces the second coil 134, and the third magnet 138 faces the third coil 135. The three magnets 136, 137, 138 are permanent magnet material, such as neodymium-iron-boron alloy, samarium-cobalt alloy, or al—ni—co alloy. It is understood that a groove can be defined in the second outer wall 122, in which the three magnets 136, 137, 138 can be received and thereby fixed to the second barrel 12.

It is understood that the first magnetic portion 131 can be arranged on the second barrel 12, correspondingly, the second magnetic portion 132 can be arranged on the first barrel 11. Two, three, or more coils and magnets can be employed. Preferably, each coil faces to a magnet, whereby, being of soft iron, the protrusion 114 is magnetized when one coil of the first magnetic portion 131 is electrified and forms a magnetic field, enhancing both magnetic field intensity of the coil and the interaction force between the coil and the corresponding magnet.

The springs 14 are elastically connected to the first barrel 11 and the second barrel 12. When the second barrel 12 is coaxial with the first barrel 11, the springs 14 are relaxed, and when the second barrel 12 is not coaxial with the first barrel 11, one or two of the springs 14 are compressed, with the other one or two springs extended, thus applying a restoring force bringing the second barrel 12 coaxial with the first barrel 11. In this embodiment, the springs 14 include a first spring 140, a second spring 141 and a third spring 142. The three springs 140, 141, 142 are equidistantly spaced, and staggered among the three coils 133, 134, 135. Each spring has a first end 143 and a second end 144 opposite to the first end 143. The first end 143 of each spring is connected to the first inner wall 111 of the first barrel 11. The second end 144 of each spring is connected to the second outer wall 122 of the second barrel 12.

When the first coil 133 and the second coil 134 receive the same current at the same time from an external source, a first attractive force is generated between the first coil 133 and the first magnet 136. A second attractive force between the second coil 134 and the second magnet 137 is also generated. The first attractive force and the second attractive force can each be decomposed into an X axis component and a Y axis component. The X axis component of the first attractive force counteracts the X axis component of the second attractive force. The Y axis component of the first attractive force superposes the Y axis component of the second attractive force. By the combined action of the first and second attractive forces, the first spring 140 is compressed and the second spring 141 and the third spring 142 extended, and the second barrel 12 moves along the Y axis in the first receiving cavity 113. If current applied to the first coil 133 and the second coil 134 stops, the first attractive force and the second attractive force are correspondingly stopped. The first, second, and third springs 140, 141, 142 return the second barrel 12 to the original position, in which the second barrel 12 is coaxial with the first barrel 11.

Since the first magnetic portion 131 includes a plurality of coils arranged in the first barrel 11, correspondingly, the second magnetic portion 132 includes a plurality of permanent magnets, such that by only changing the value and direction of the current to coils of the first magnetic portion 131, the second barrel 12 can be moved on the plane X/Y.

The first barrel 11 and the second barrel 12 are not limited to a cylindrical shape, and can alternatively be a hollow triangular prism, quadrangular prism, or other shape. The first barrel 11 can be of different shape than the second barrel 12, and only the first magnetic portion 131 needs to be arranged correspondingly to the second magnetic portion 132.

With the second barrel 12 received in the first barrel 11, volume is minimized and structure of the actuator 10 becomes simple.

Figure 4:
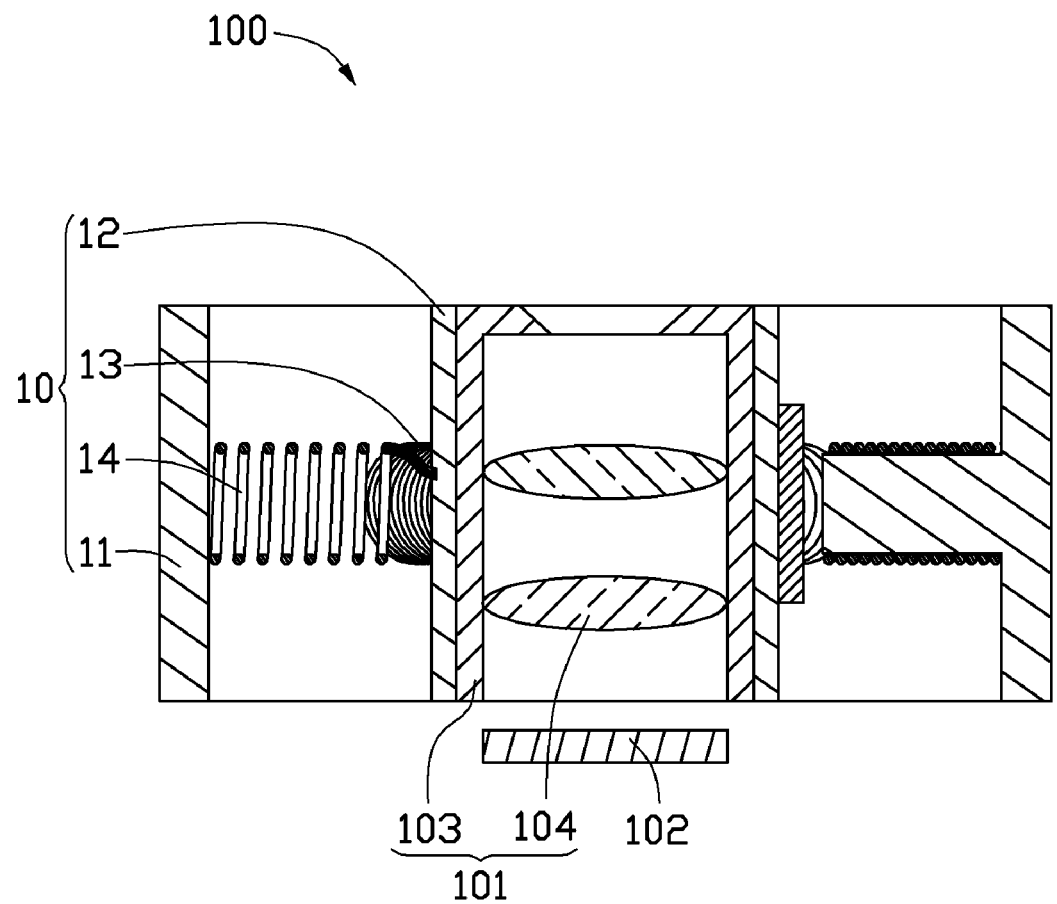
FIG. 4 is a schematic cross-section of an anti-vibration camera module in accordance with an exemplary embodiment.

Referring to FIG. 4, an anti-vibration camera module 100 utilizing the actuator 10, according to an exemplary embodiment, includes a lens module 101 and an image sensor 102.

The lens module 101 is received in the second receiving cavity 123 of the second barrel 12, and can move with the second barrel 12. The lens module 101 includes a barrel 103 and optical elements 104 received in the barrel 103.

The image sensor 102 is positioned outside the actuator 10, and is optically coupled with the lens module 101. In detail, the image sensor 102 can be attached on a circuit board (not shown) coupled with the barrel 103. When the second barrel 12 is coaxial with the first barrel 11, a central axis of the image sensor 102 aligns with an optical axis of the lens module 101.

When shaking occurs, the first magnetic portion 131 can be driven by a proper current, such that the first magnetic portion 131 can effect with the second magnetic portion 132, and then move the second barrel 12, such that the lens module 101 in the second barrel 12 can be moved on the X/Y plane. As a result, the imaging position on the image sensor 102 can be corrected to avoid blurring.

It is understood that the lens module 101 can be positioned outside the actuator 10, and the image sensor 102 can be positioned in the actuator 10 and be optically coupled with the lens module 101. The actuator 10 driving the image sensor 102 compensates for external agitation of the anti-vibration camera module 100.

While the present disclosure has been described as having preferred or exemplary embodiments, the embodiments can be further modified within the spirit and scope of this disclosure. This application is therefore intended to cover any variations, uses, or adaptations of the embodiments using the general principles of the invention as claimed. Further, this application is intended to cover such departures from the present disclosure as come within known or customary practice in the art to which the invention pertains and which fall within the limits of the appended claims or equivalents thereof.

What is claimed is:

1. An actuator, comprising:
   a first barrel comprising a first inner wall and a first outer wall;
   a second barrel movably received in the first barrel and comprising a second inner wall and a second outer wall, the first inner wall facing the second outer wall;
   a first magnetic portion and a second magnetic portion arranged between the first barrel and the second barrel, the first magnetic portion fixed to the first inner wall, the second magnetic portion fixed to the second outer wall, the first magnetic portion having a face facing the second magnetic portion and facing away from a central axis of the second barrel, the first and second magnetic portions configured for cooperatively driving the second barrel to move in the first barrel on a plane perpendicular to a central axis of the first barrel; and
   a plurality of springs elastically connected to the first inner wall and the second outer wall, for providing a restoring force between the first barrel and the second barrel when the first barrel is not coaxial with the second barrel.

2. The actuator as claimed in claim 1, wherein at least one of the first magnetic portion and the second magnetic portion comprises a magnet.

3. The actuator as claimed in claim 2, wherein the first magnetic portion comprises a plurality of coils equidistantly spaced along the same circumference of the first barrel, and the second magnetic portion comprises a plurality of permanent magnets.

4. The actuator as claimed in claim 3, wherein a plurality of protrusions protrude from the first inner wall toward the central axis of the first barrel, surrounded by the coils, respectively.

5. The actuator as claimed in claim 4, wherein the protrusions are soft iron.

6. The actuator as claimed in claim 3, wherein the number of springs is the same as that of the coils, the springs are equidistantly spaced and spatially correspond to the coils, each spring is arranged between two adjacent coils, and each spring and the corresponding coil are positioned at opposite sides of the second barrel.

7. The actuator as claimed in claim 6, wherein the connection line of the spring and the corresponding coil passes through the central axis of the second barrel.

8. The actuator as claimed in claim 3, wherein a groove is defined in the second outer wall, the permanent magnets are fixedly received in the groove.

9. The actuator as claimed in claim 1, wherein the first barrel and the second barrel are coaxial when the springs are relaxed.

10. The actuator as claimed in claim 1, wherein the first barrel and the second barrel are hollow and cylindrical.

11. The actuator as claimed in claim 1, wherein the first magnetic portion faces the second magnetic portion in a direction substantially perpendicular to the central axis of the second barrel.

12. An anti-vibration camera module, comprising:
   an actuator, comprising:
     a first barrel comprising a first inner wall and a first outer wall;
     a second barrel movably received in the first barrel and comprising a second inner wall and a second outer wall, the first inner wall facing the second outer wall;
     a first magnetic portion and a second magnetic portion arranged between the first barrel and the second barrel, the first magnetic portion fixed to the first inner wall, the second magnetic portion fixed to the second outer wall, the first magnetic portion having a face facing the second magnetic portion and facing away from a central axis of the second barrel, the first and second magnetic portions configured for cooperatively driving the second barrel to move in the first barrel on a plane perpendicular to a central axis of the first barrel;

a plurality of springs elastically connected to the first inner wall and the second outer wall, for providing a restoring force between the first barrel and the second barrel when the first barrel is not coaxial with the second barrel;

a lens module received in the second barrel of the actuator; and an image sensor positioned outside the actuator, optically coupled with the lens module.

13. The anti-vibration camera module as claimed in claim 12, wherein at least one of the first magnetic portion and the second magnetic portion comprises a magnet.

14. The anti-vibration camera module as claimed in claim 13, wherein the first magnetic portion comprises a plurality of coils equidistantly spaced along the same circumference of the first barrel, the second magnetic portion comprising a plurality of permanent magnets.

15. The anti-vibration camera module as claimed in claim 14, wherein a plurality of protrusions protrude from the first inner wall toward a central axis of the first barrel, and are surrounded by the coils, respectively.

16. The anti-vibration camera module as claimed in claim 15, wherein the protrusions are soft iron.

17. The anti-vibration camera module as claimed in claim 14, wherein the number of springs is the same as that of the coils, the springs are equidistantly spaced and spatially correspond to the coils, each spring arranged between two adjacent coils, and each spring and the corresponding coil are positioned at opposite sides of the second barrel.

18. The actuator as claimed in claim 17, wherein the connection line of the spring and the corresponding coil passes through the central axis of the second barrel.

19. The anti-vibration camera module as claimed in claim 12, wherein the first barrel and the second barrel are coaxial when the springs are relaxed.

20. An anti-vibration camera module, comprising:
an actuator, comprising:
a first barrel comprising a first inner wall and a first outer wall;
a second barrel movably received in the first barrel and comprising a second inner wall and a second outer wall, the first inner wall facing the second outer wall;
a first magnetic portion and a second magnetic portion arranged between the first barrel and the second barrel, the first magnetic portion fixed to the first inner wall, the second magnetic portion fixed to the second outer wall, the first magnetic portion having a face facing the second magnetic portion and facing away from a central axis of the second barrel, and the first and second magnetic portions configured for cooperatively driving the second barrel to move in the first barrel on a plane perpendicular to a central axis of the first barrel;
a plurality of springs elastically connected to the first inner wall and the second outer wall, for providing a restoring force between the first barrel and the second barrel when the first barrel is not coaxial with the second barrel;
a lens module positioned outside the actuator; and
an image sensor received in the second barrel of the actuator, optically coupled with the lens module.

* * * * *